(12) United States Patent
Wu (10) Patent No.: US 9,217,485 B2
(45) Date of Patent: Dec. 22, 2015

(54) HYDRAULIC DAMPER DEVICE

(71) Applicant: Chung-Hsing Wu, Tainan (TW)

(72) Inventor: Chung-Hsing Wu, Tainan (TW)

( * ) Notice: Subject to any disclaimer, the term of this patent is extended or adjusted under 35 U.S.C. 154(b) by 103 days.

(21) Appl. No.: 14/080,289

(22) Filed: Nov. 14, 2013

(65) Prior Publication Data

US 2015/0129380 A1    May 14, 2015

(51) Int. Cl.
    *F16F 9/516*     (2006.01)
    *F16F 9/34*     (2006.01)

(52) U.S. Cl.
    CPC ............... *F16F 9/516* (2013.01); *F16F 9/3415* (2013.01)

(58) Field of Classification Search
    CPC ..................... F16F 9/34; F16F 9/516
    USPC .......................... 188/313, 317, 269
    See application file for complete search history.

(56) References Cited

U.S. PATENT DOCUMENTS

| | | | | |
|---|---|---|---|---|
| 3,143,757 A * | 8/1964 | Quinn | ................................. | 16/57 |
| 3,937,450 A * | 2/1976 | Bauer | ............................ | 267/113 |
| 4,938,324 A * | 7/1990 | Van Dyke | ....................... | 188/317 |
| 5,157,806 A * | 10/1992 | Wartian | .............................. | 16/66 |
| 5,471,708 A * | 12/1995 | Lynch | ................................ | 16/66 |
| 5,806,840 A * | 9/1998 | Peters | ........................... | 267/64.15 |
| 6,119,832 A * | 9/2000 | Hofmann | ................. | 188/322.13 |
| 6,179,099 B1 * | 1/2001 | Koch et al. | ..................... | 188/277 |
| 6,460,839 B2 * | 10/2002 | Muller | ............................ | 267/221 |

* cited by examiner

*Primary Examiner* — Robert A Siconolfi
*Assistant Examiner* — Mahbubur Rashid
(74) *Attorney, Agent, or Firm* — Birch, Stewart, Kolasch & Birch, LLP (57) ABSTRACT

A hydraulic damper device includes a cylinder unit including a cylinder body having an inner surface and a plug, and a piston unit including a piston, a piston rod and a valve member. The piston defines an annular groove. The valve member is disposed movably in the annular groove. The piston cooperates with the inner surface to define a valve opening and a valve seat. The valve seat has a truncated conical surface. The valve member is movable between a closing position, in which the valve member covers sealingly the valve opening and abuts against the truncated conical surface, and an opening position, in which the valve member is spaced apart from the truncated conical surface.

6 Claims, 11 Drawing Sheets

HYDRAULIC DAMPER DEVICE

BACKGROUND OF THE INVENTION

1. Field of the Invention

This invention relates to a hydraulic damper device, more particularly to a hydraulic damper device for retarding movement of a movable member, such as a door or a drawer toward a stationary member, such as a framework or a furniture article.

2. Description of the Related Art

Figure 1:
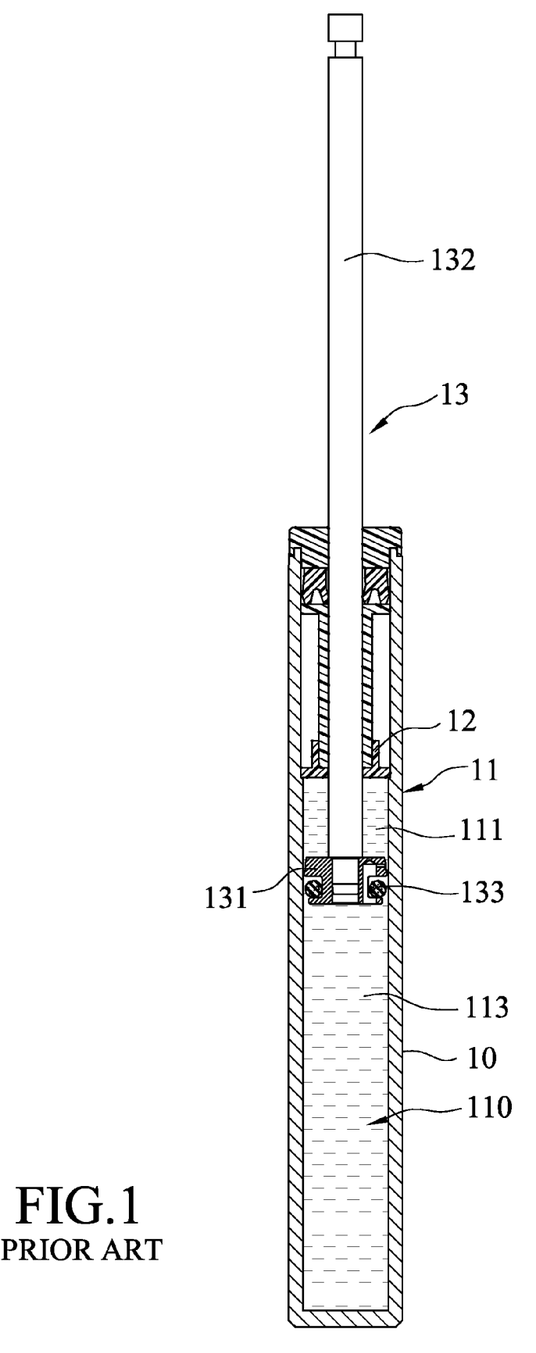
FIG. 1 is a sectional view of a conventional hydraulic damper device.
Figure 2:
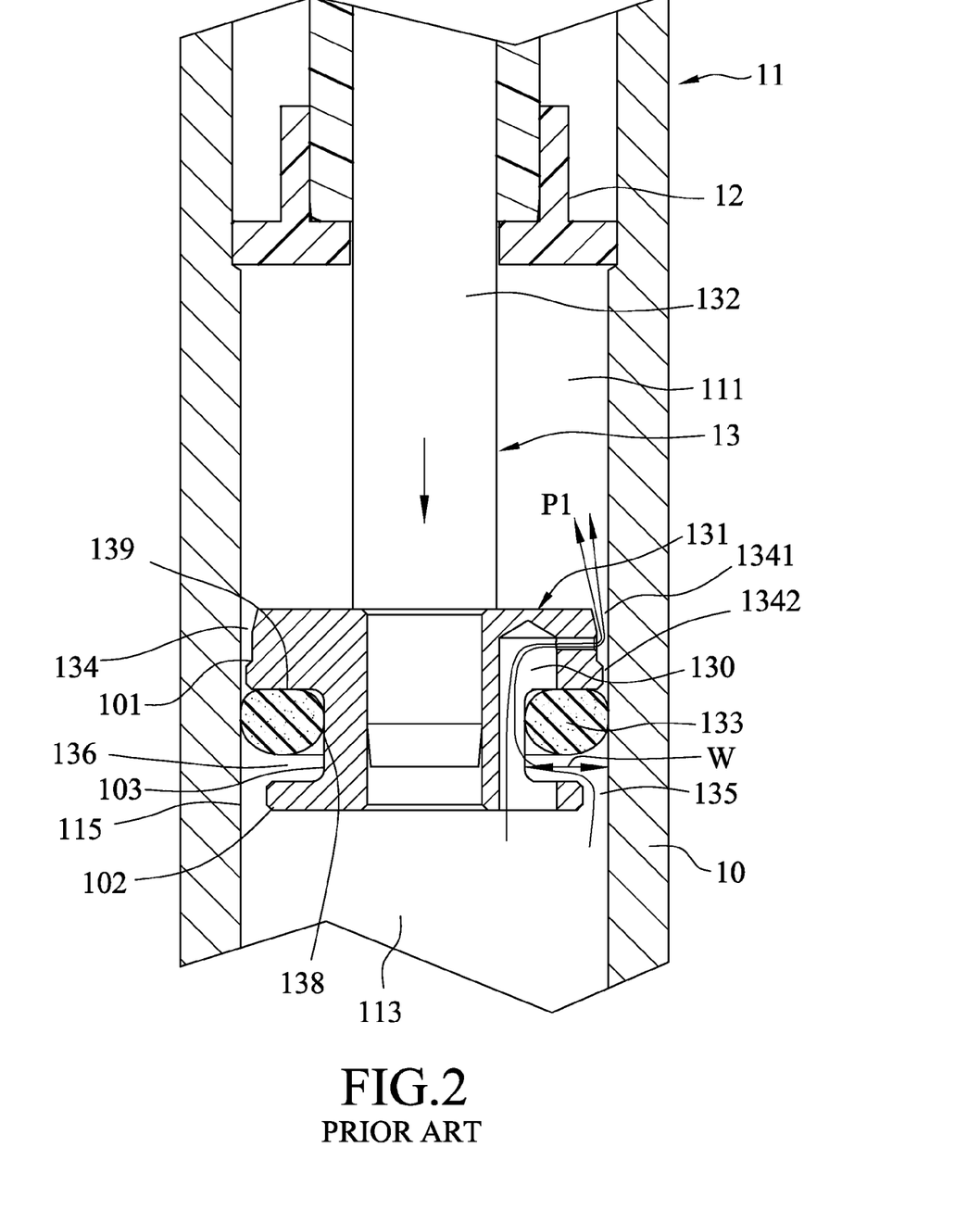
FIG. 2 is a fragmentary sectional view illustrating a state where an annular valve member of the conventional hydraulic damper device is disposed at a closing position.
Figure 3:
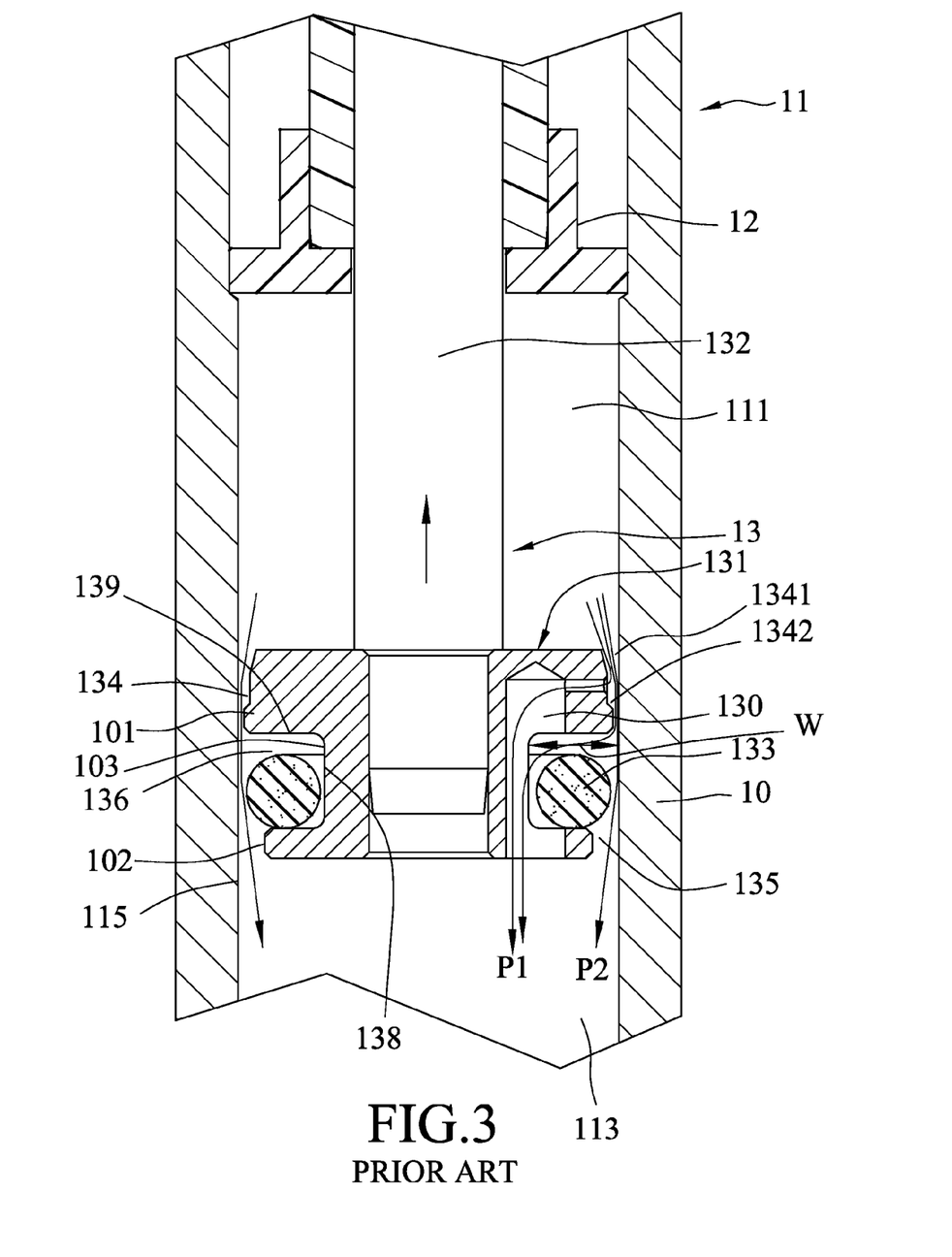
FIG. 3 is a fragmentary sectional view illustrating another state where the annular valve member of the conventional hydraulic damper device is disposed at an opening position.

As illustrated in FIGS. 1 to 3, a conventional hydraulic damper device, which is provided for connecting a movable member (not shown), such as a door or a drawer, to a stationary member (not shown), such as a framework, and for retarding movement of the movable member toward and away from the stationary member, generally includes a cylinder unit 11 and a piston unit 13. The cylinder unit 11 includes a cylinder body 10 and a plug 12 that is disposed slidably in and cooperates with the cylinder body 10 to define a liquid chamber 110, which is adapted to receive a hydraulic liquid therein. The piston unit 13 includes a piston 131, a piston rod 132 that extends through the plug 12 into the liquid chamber 110 to connect with the piston 131, and an elastic deformable annular valve member 133. The piston 131 is disposed in the liquid chamber 110 to divide the liquid chamber 100 into first and second compartments 111, 113, and includes first and second annular segments 101, 102 and an annular middle segment 103 that is disposed between the first and second annular segments 101, 102 and that cooperates with the first and second annular segments 101, 102 to define an annular groove 136 thereamong. The piston 131 defines a fluid passage 130 that extends through the first and second annular segments 101, 102 and the middle segment 103. The first and second annular segments 101, 102 cooperate with an inner surface 115 of the cylinder body 10 to define first and second gaps 134, 135, respectively. The fluid passage 130 cooperates with an upper section 1341 of the first gap 134 to define a first fluid path (P1) (see FIG. 2) for fluid communication between the first and second compartments 111, 113. The second gap 135 cooperates with the annular groove 136 and the first gap 134 to define a second fluid path (P2) (see FIG. 3) for fluid communication between the first and second compartments 111, 113. The annular valve member 133 is disposed movably in the annular groove 136, and is driven by the hydraulic liquid through axial movement of the piston 131 to move relative to the piston 131 between a closing position (see FIG. 2) and an opening position (see FIG. 3). In the closing position, the annular valve member 133 is deformed and abuts against the first annular segment 101, the middle segment 103 and the inner surface 115 of the cylinder body 10 so as to close a lower section 1342 of the first gap 134, so that fluid communication between the first and second compartments 111, 113 is permitted through the first fluid path (P1) and is prevented through the second fluid path (P2). In the opening position, the annular valve member 131 rests on the second annular segment 102, and is away from the lower section 1342 of the first gap 134, so that fluid communication between the first and second compartments 111, 113 is permitted through the first and second fluid paths (P1, P2).

It is noted that the inner surface 115 of the cylinder body 10 is cylindrical in shape and that the annular middle segment 103 has a cylindrical outer surface 138. As such, the annular groove 136 has a constant radial width (W) along an axial length thereof. Since the annular valve member 133 is pressed against an end face 139 of the first annular segment 101 and is deformed by the hydraulic liquid when the annular valve member 133 is moved by the hydraulic liquid from the opening position to the closing position as a result of movement of the piston 131 away from the plug 12, the annular valve member 133 is undesirably clamped tightly between the inner surface 115 and the cylindrical outer surface 138. As such, the resistance to movement of the annular valve member 133 from the closing position toward the opening position is considerably increased, and a longer time is required to release the annular valve member 133 from the clamping action and to permit the annular valve member 133 to return to its original shape (i.e., non-deformed shape).

SUMMARY OF THE INVENTION

Therefore, an object of the present invention is to provide a hydraulic damper device that can overcome the aforesaid drawback associated with the prior art.

According to this invention, there is provided a hydraulic damper device that comprises: a cylinder unit including a cylinder body and a plug, the cylinder body having an inner surface that cooperates with the plug to define a liquid chamber which is adapted to receive a hydraulic liquid therein; and a piston unit including a piston, a piston rod, and an annular valve member. The piston is movably disposed in the liquid chamber to partition the liquid chamber into first and second compartments. The piston rod extends into the liquid chamber to connect with the piston. The piston includes first and second piston portions that are aligned with each other along an axis of the cylinder body, and defines an annular groove between the first and second piston portions. The annular groove is in fluid communication with the second compartment. The annular valve member is disposed movably in the annular groove. The first piston portion is formed with a fluid passage that is in fluid communication with the annular groove, and cooperates with the inner surface to define a valve opening and a valve seat therebetween. The valve opening is in fluid communication with the first compartment. The valve seat has a truncated conical surface that is disposed around the axis and that is axially tapered toward the second piston portion. The annular valve member is driven by the hydraulic liquid through axial movement of the piston to move relative to the piston between a closing position, in which the annular valve member abuts sealingly against the valve seat to cover the valve opening so as to prevent fluid communication between the valve opening and the annular groove, and an opening position, in which the annular valve member rests on the second piston portion and is spaced apart from the valve seat to uncover the valve opening so as to permit fluid communication between the valve opening and the annular groove.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail, it should be noted that same reference numerals have been used to denote like elements throughout the specification.

Referring to FIGS. 4 to 7, the first preferred embodiment of a hydraulic damper device according to the present invention is shown to include a cylinder unit 2 and a piston unit 4 for connecting a movable member (not shown), such as a door or a drawer, to a stationary member (not shown), such as a framework, and for retarding movement of the movable member toward and away from the stationary member.

Figure 4:
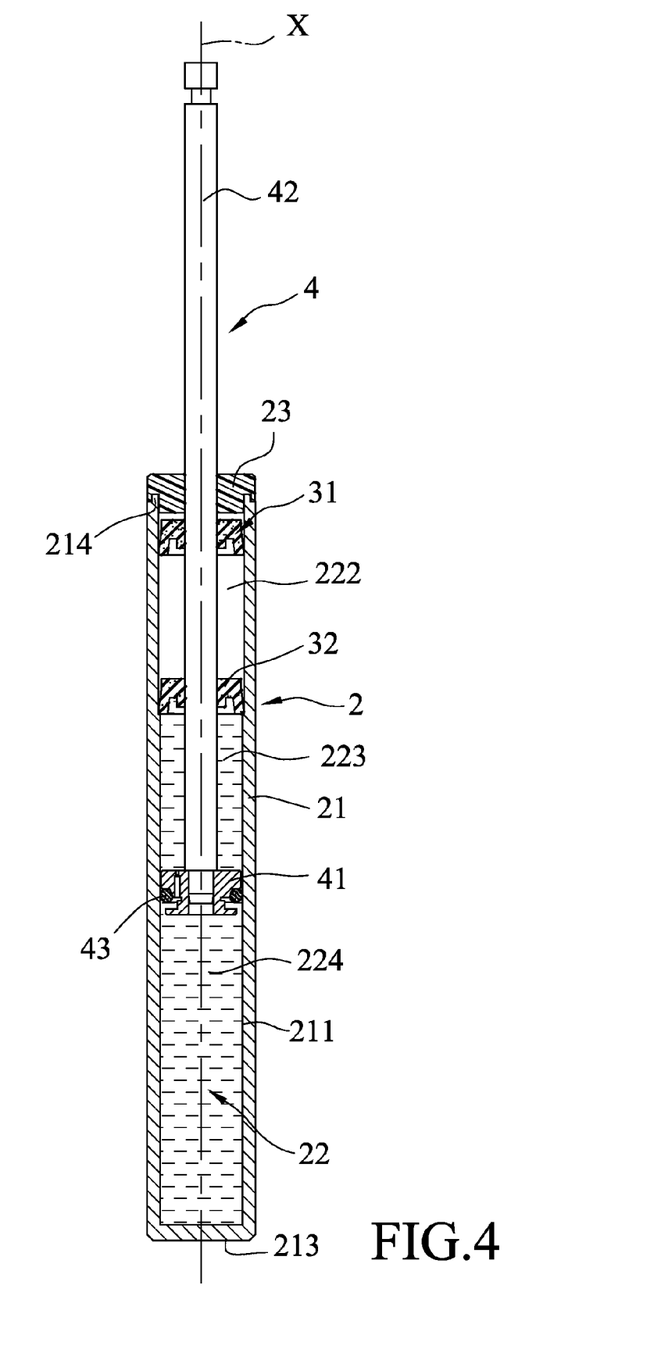
FIG. 4 is a sectional view of the first preferred embodiment of a hydraulic damper device according to this invention.

The cylinder unit 2 includes a cylinder body 21, a first plug 32, a second plug 23, and a third plug 31. The cylinder body 21 has an inner surface 211 that cooperates with the first plug 32 to define a liquid chamber 22, which is adapted to receive a hydraulic liquid therein. The cylinder body 21 further has a closed end 213 and an open end 214 that is axially opposite to the closed end 213. The second plug 23 is mounted to the open end 214 of the cylinder body 21. The third plug 31 is disposed in the cylinder body 21 adjacent to the second plug 23.

The piston unit 4 includes a piston 41, a piston rod 42, and an elastic deformable annular valve member 43. The piston 41 is movably disposed in the liquid chamber 22 to partition the liquid chamber 22 into first and second compartments 223, 224. The piston rod 42 extends through the second plug 23 and the third plug 31 into the liquid chamber 22 in the cylinder body 21 to connect with the piston 41. The first plug 32 is slidably sleeved on the piston rod 42, and cooperates with the inner surface 211 of the cylinder body 21 and the second plug 23 to define a gas chamber 222 that is separated from the liquid chamber 22 by the first plug 32. The piston 41 includes first and second piston portions 411, 416 that are aligned with each other along an axis (X) of the cylinder body 21, and defines an annular groove 417 between the first and second piston portions 411, 416. The annular groove 417 is in fluid communication with the second compartment 224. The annular valve member 43 is disposed movably in the annular groove 417. The first piston portion 411 is formed with a fluid passage 40 that is in fluid communication with the annular groove 417, and cooperates with the inner surface 211 to define a valve opening 433 and a valve seat 434 therebetween. The valve opening 433 is in fluid communication with the first compartment 223. The valve seat 434 has a truncated conical surface 415 that is disposed around the axis (X) and that is axially tapered toward the second piston portion 416. The annular valve member 43 is driven by the hydraulic liquid through axial movement of the piston 41 to move relative to the piston 41 between a closing position (see FIG. 7), in which the annular valve member 43 abuts sealingly against the valve seat 434 to cover the valve opening 433 so as to prevent fluid communication between the valve opening 433 and the annular groove 417, and an opening position (see FIG. 8), in which the annular valve member 43 rests on the second piston portion 416 and is spaced apart from the valve seat 434 to uncover the valve opening 433 so as to permit fluid communication between the valve opening 433 and the annular groove 417.

In this embodiment, the first piston portion 411 of the piston 41 has an annular segment 4112 and a truncated conical segment 4113 that is tapered from the annular segment 4112 toward the second piston portion 416 and that defines the truncated conical surface 415. The annular segment 4112 has an annular peripheral end face 4110 that cooperates with the inner surface 211 to define an annular first gap 412 which has an end defining the valve opening 433.

The fluid passage 40 extends through the annular segment 4112 and the truncated conical segment 4113, and is disposed between the truncated conical surface 415 and the axis (X). The truncated conical surface 415 has an end 4152. The annular segment 4112 has an end face 414 that extends radially from the end 4152 of the truncated conical surface 415 toward the inner surface 211 of the cylinder body 21 and that cooperates with the truncated conical surface 415 and the inner surface 211 of the cylinder body 21 to define the valve seat 434.

Figure 7:
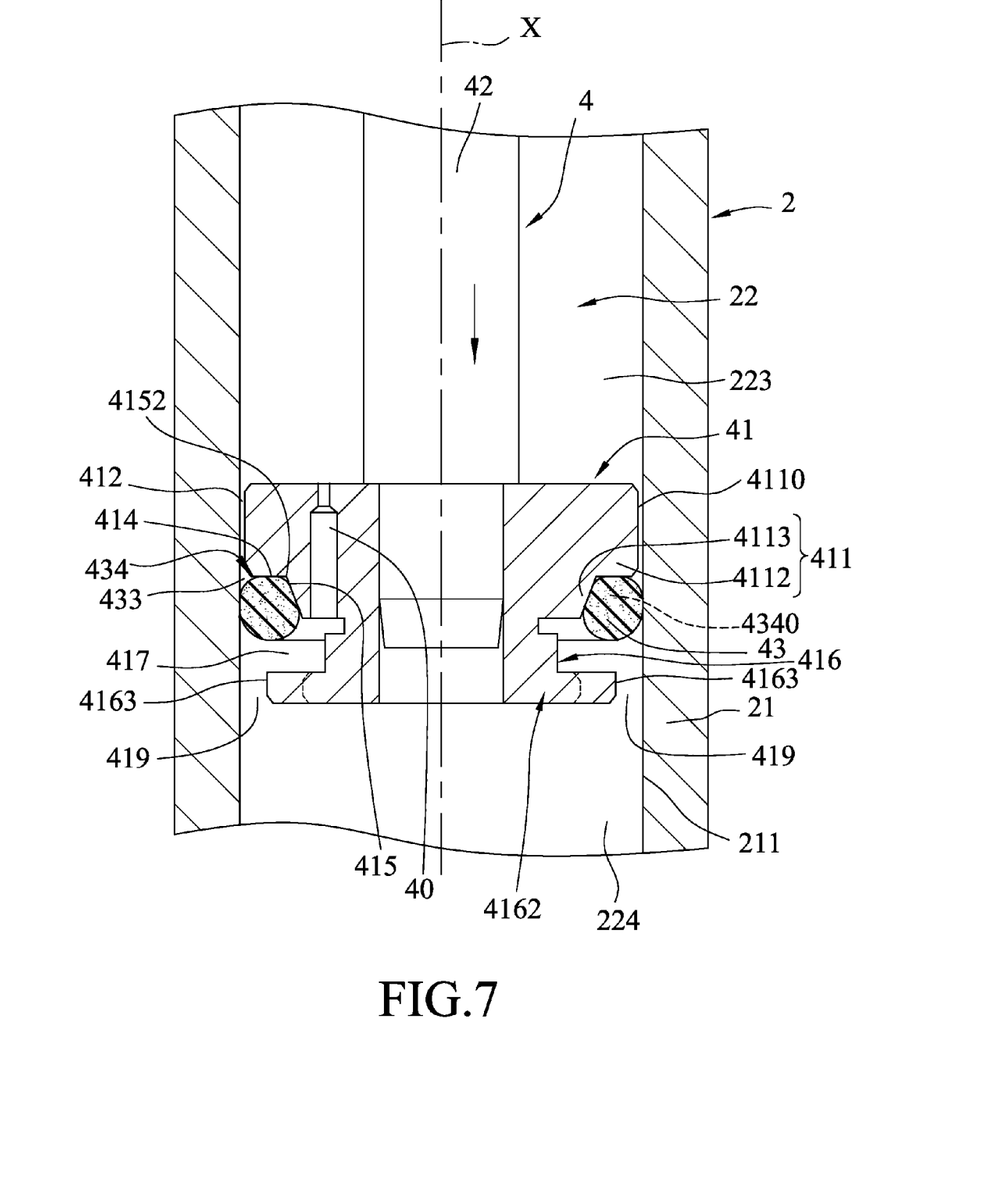
FIG. 7 is a fragmentary sectional view illustrating a state where an annular valve member of the first preferred embodiment is disposed at a closing position.
Figure 8:
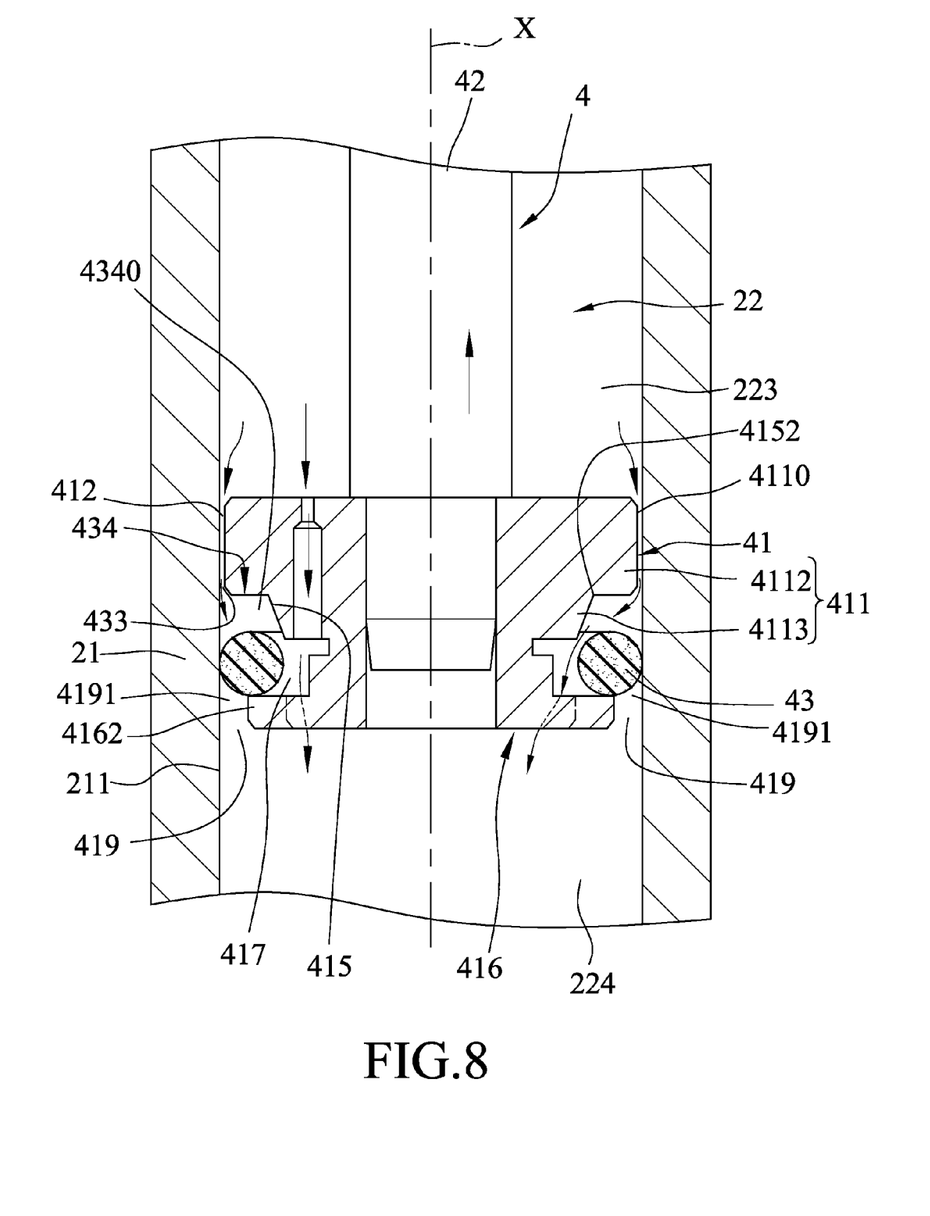
FIG. 8 is a fragmentary sectional view illustrating another state where the annular valve member of the first preferred embodiment is disposed at an opening position.

The valve seat 434 defines an annular recess 4340. The annular valve member 43 extends into the annular recess 4340 when the annular valve member 43 is disposed at the closing position. The truncated conical surface 415 and the inner surface 211 diverge from each other in a direction from the end face 414 of the annular segment 4112 toward the second piston portion 416 of the piston 41.

Figure 5:
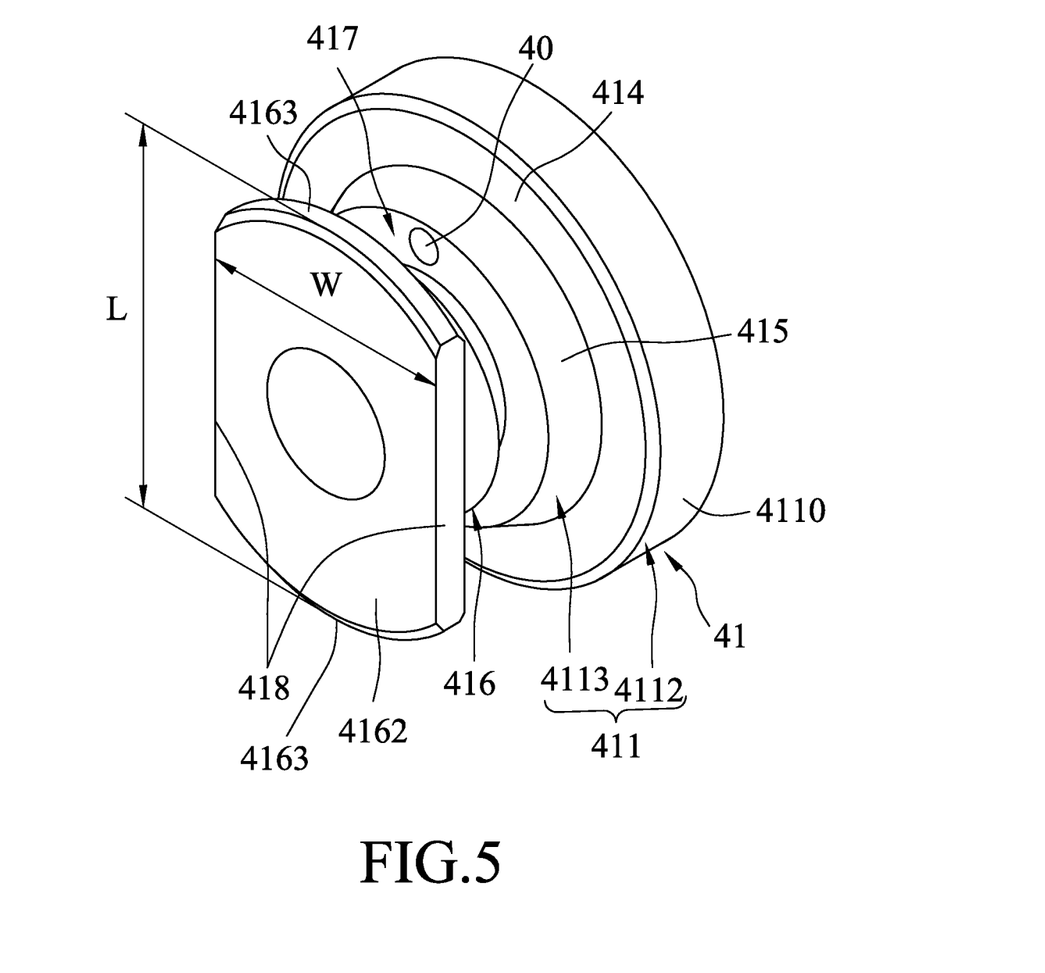
FIG. 5 is a perspective view of a piston of the first preferred embodiment.
Figure 6:
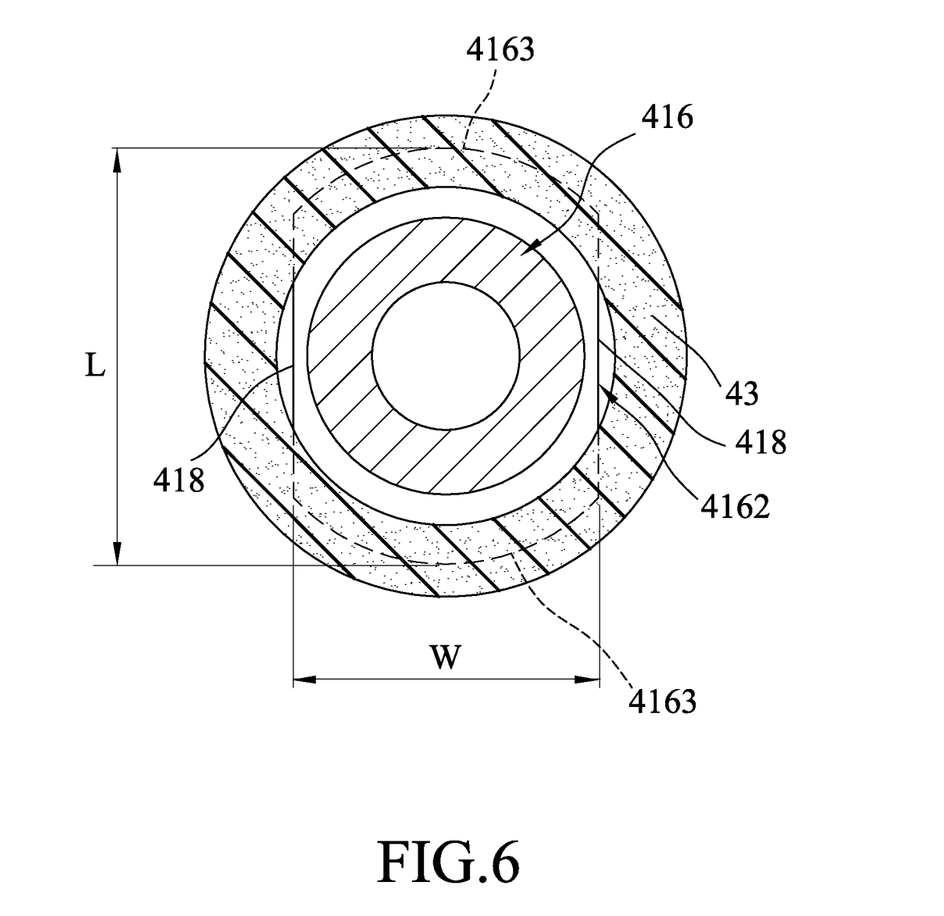
FIG. 6 is a sectional top view of the piston of the first preferred embodiment.

The second piston portion 416 of the piston 41 has a truncated circular plate segment 4162 that has a length (L) along a lengthwise direction, and a width (W) along a widthwise direction perpendicular to the lengthwise direction. The annular valve member 43 has an inner diameter less than the length (L) of the truncated circular plate segment 4162 and greater than the width (W) of the truncated circular plate segment 4162. The truncated circular plate segment 4162 has two opposite end faces 418 that cooperate with the inner surface 211 to define two opposite fluid channels 4165 therebetween, respectively (see FIG. 9). The fluid channels 4165 are constantly in fluid communication with the annular groove 417 and the second compartment 224 even when the annular valve member 43 is disposed at the opening position.

Figure 9:
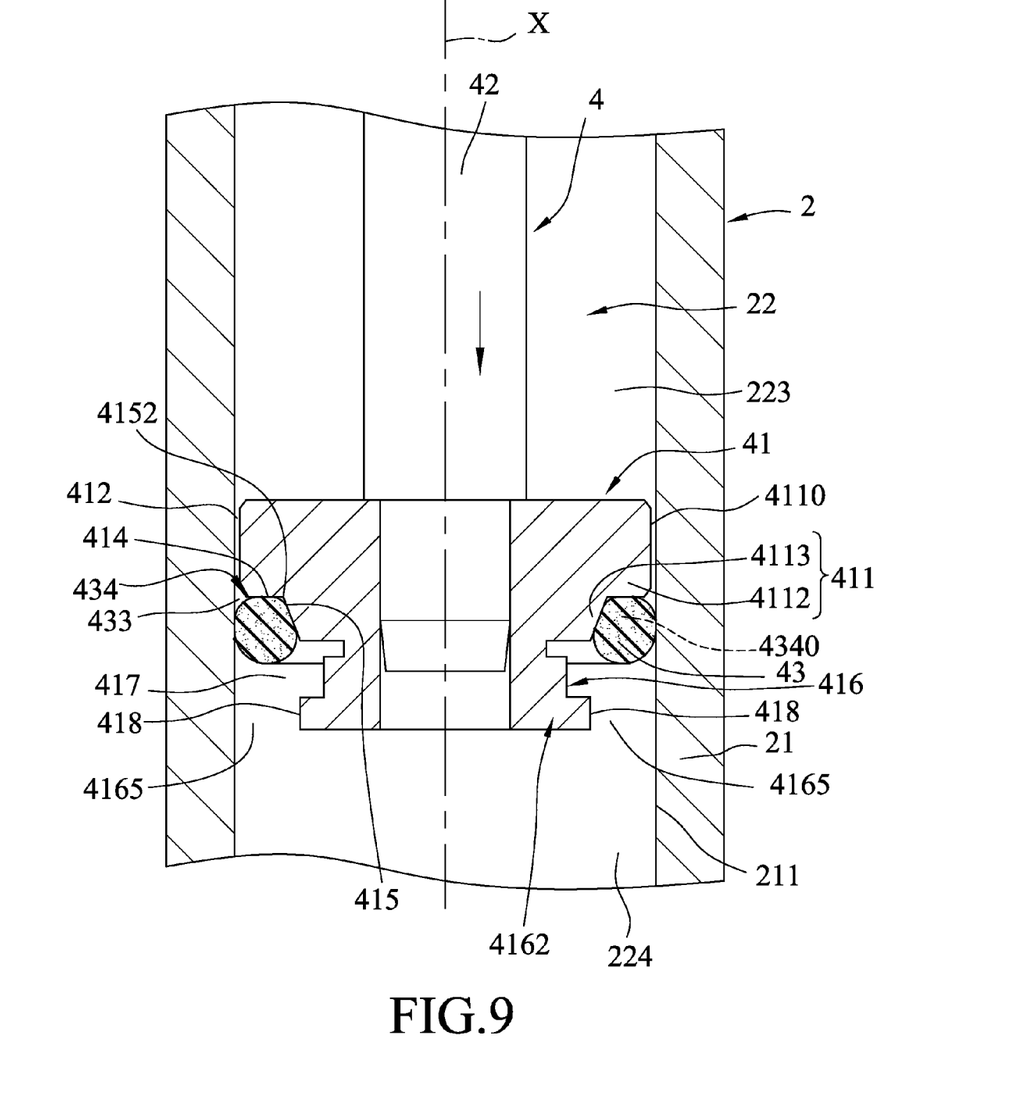
FIG. 9 is a fragmentary sectional view of the hydraulic damper device in a different viewing angle perpendicular to that in FIG. 7.

The truncated circular plate segment 4162 further has two circumferentially extending end faces 4163 which cooperate with the inner surface 211 of the cylinder body 21 to define two second gaps 419 therebetween, respectively. Each of the second gaps 419 has an axial end 4191 that is disposed adjacent to the annular groove 417. The annular valve member 43 is spaced apart from the axial end 4191 of each second gap 419 for permitting fluid communication between the second compartment 224 and the annular groove 417 through the second gaps 419 when the annular valve member 43 is disposed at the closing position. The annular valve member 43 closes the axial end 4191 of each second gap 419 for preventing fluid communication between the second compartment 224 and the annular groove 417 through the second gaps 419 when the annular valve member 42 is disposed at the opening position.

Figure 10:
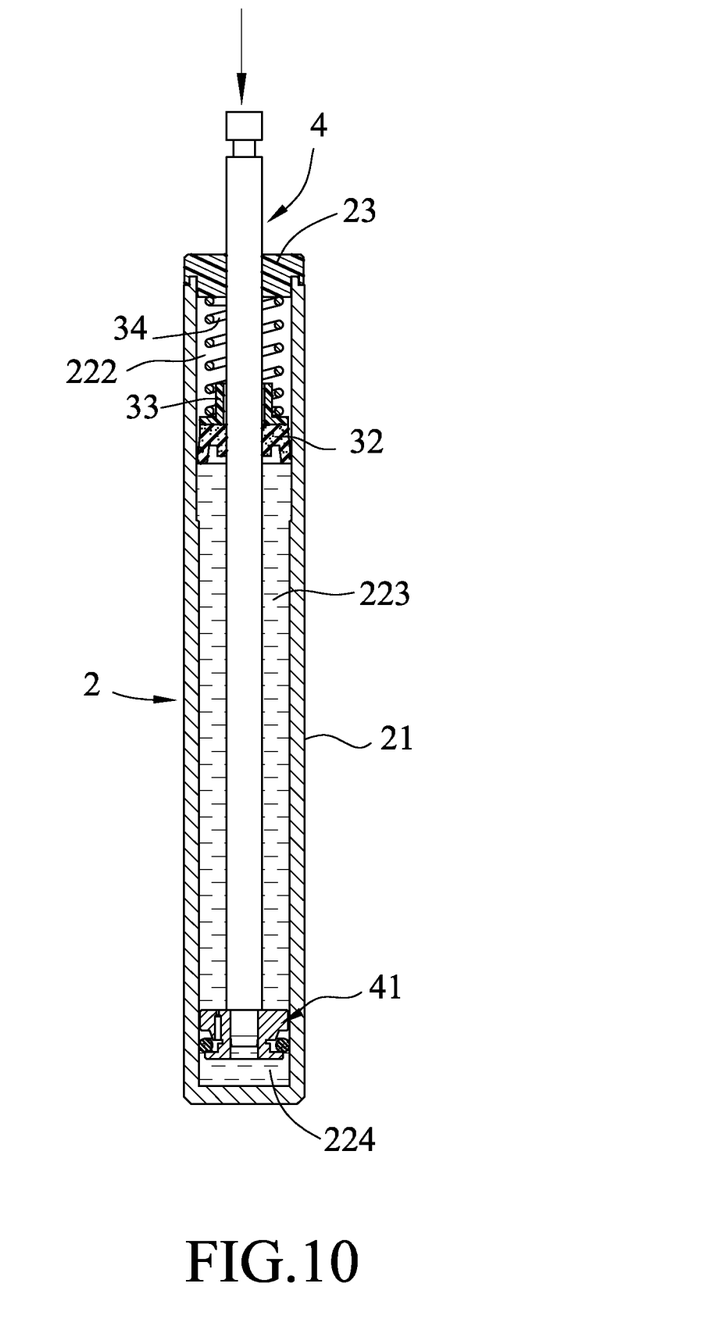
FIG. 10 is a sectional view of the second preferred embodiment of the hydraulic damper device according to this invention, illustrating a state where a spring is compressed when a piston is moved away from a plug.
Figure 11:
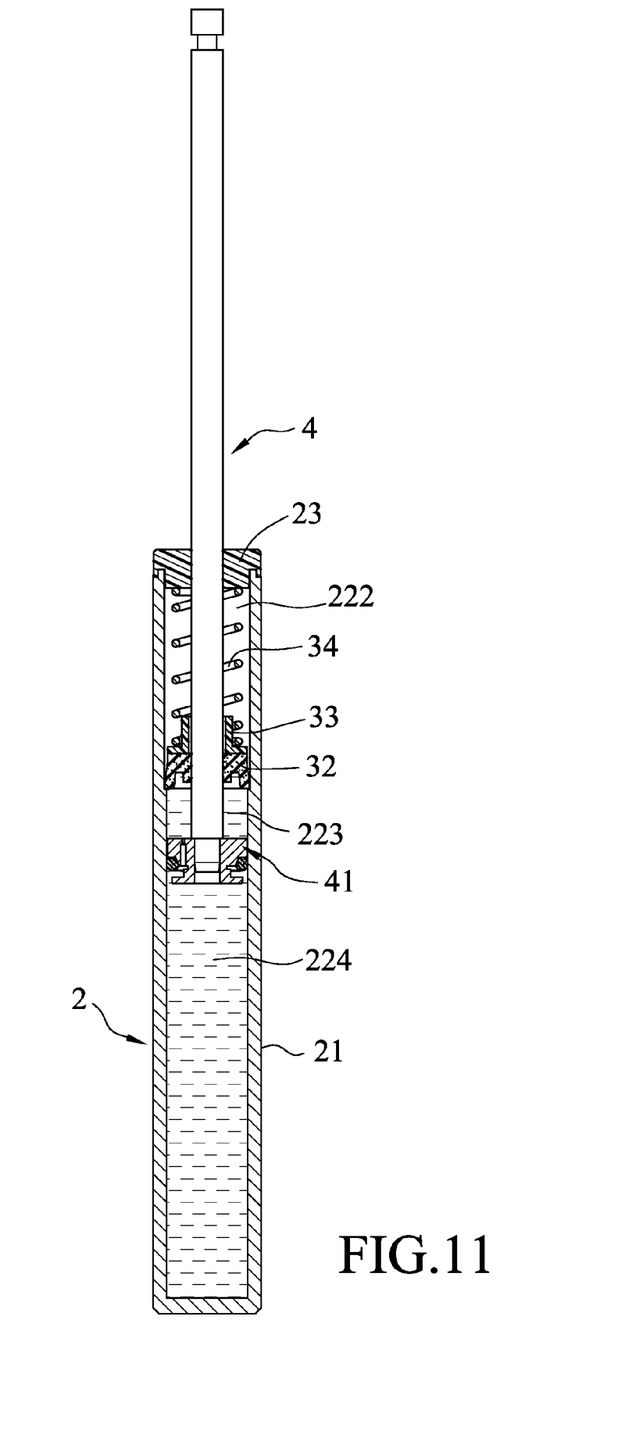
FIG. 11 is a sectional view of the second preferred embodiment illustrating another state where the spring is released from compression when the piston is moved toward the plug.

FIGS. 10 and 11 illustrate the second preferred embodiment of the hydraulic damper device according to the present invention. The second preferred embodiment differs from the previous embodiment in that the third plug 31 is replaced with a spring 34, such that the spring 34 is disposed in the gas chamber 222 between the first and second plugs 32, 23, and urges against the first and second plugs 32, 23. A spring seat 33 is provided on the first plug 32 for positioning the spring 33.

In this embodiment, the first plug 32 is moved toward the second plug 23 to compress the spring 34 when the piston 41 is moved axially away from the first plug 32 (see FIG. 10), and is moved away from the second plug 23 by the urging action of the spring 34 when the piston 41 is moved axially toward the first plug 32 (see FIG. 11).

By forming the piston 41 with a structure that has the truncated conical surface 415 which diverges from the inner surface 211 of the cylinder body 21, the annular valve member 43 can be easily moved from the closing position to the opening position and return to its original shape (i.e., non-deformed shape) as compared to that of the aforesaid conventional hydraulic damper device.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A hydraulic damper device comprising:
   a cylinder unit including a cylinder body and a first plug, said cylinder body having an inner surface that cooperates with said first plug to define a liquid chamber which is adapted to receive a hydraulic liquid therein; and
   a piston unit including a piston, a piston rod, and an annular valve member, said piston being movably disposed in said liquid chamber to partition said liquid chamber into first and second compartments, said piston rod extending into said liquid chamber to connect with said piston, said piston including first and second piston portions that are aligned with each other along an axis of said cylinder body and defining an annular groove between said first and second piston portions, said annular groove being in fluid communication with said second compartment, said annular valve member being disposed movably in said annular groove, said first piston portion being formed with a fluid passage that is in fluid communication with said annular groove, and cooperating with said inner surface to define a valve opening and a valve seat therebetween, said valve opening being in fluid communication with said first compartment, said valve seat having a truncated conical surface that is disposed around said axis and that is axially tapered toward said second piston portion;
   wherein said annular valve member is driven by the hydraulic liquid through axial movement of said piston to move relative to said piston between a closing position, in which said annular valve member abuts sealingly against said valve seat to cover said valve opening so as to prevent fluid communication between said valve opening and said annular groove, and an opening position, in which said annular valve member rests on said second piston portion and is spaced apart from said valve seat to uncover said valve opening so as to permit fluid communication between said valve opening and said annular groove, and
   wherein said second piston portion of said piston has a truncated circular plate segment that has a length along a lengthwise direction, and a width along a widthwise direction perpendicular to the lengthwise direction, said annular valve member having an inner diameter less than the length of said truncated circular plate segment and greater than the width of said truncated circular plate segment, said truncated circular plate segment cooperating with said inner surface to define at least one fluid channel therebetween, said fluid channel being in fluid communication with said annular groove and said second compartment.

2. The hydraulic damper device according to claim 1, wherein said first piston portion of said piston has an annular segment and a truncated conical segment that is tapered from said annular segment toward said second piston portion and that defines said truncated conical surface, said annular segment having an annular peripheral end face that cooperates with said inner surface to define said valve opening.

3. The hydraulic damper device according to claim 2, wherein said fluid passage extends through said annular segment and said truncated conical segment, and is disposed between said truncated conical surface and said axis, said truncated conical surface having an end, said annular segment having an end face that extends radially from said end of said truncated conical surface toward said inner surface and that cooperates with said truncated conical surface and said inner surface to define said valve seat.

4. The hydraulic damper device according to claim 3, wherein said valve seat defines an annular recess, said annular valve member extending into said annular recess when said annular valve member is disposed at the closing position, said truncated conical surface and said inner surface diverging from each other in a direction from said end face of said annular segment toward said second piston portion.

5. The hydraulic damper device according to claim 1, wherein said truncated circular plate segment has at least one circumferentially extending end face which cooperates with said inner surface to define a gap therebetween, said gap having an axial end that is disposed adjacent to said annular groove, said annular valve member being spaced apart from said axial end of said gap for permitting fluid communication between said second compartment and said annular groove through said gap when said annular valve member is disposed at the closing position, said annular valve member closing said axial end of said gap for preventing fluid communication between said second compartment and said annular groove through said gap when said annular valve member is disposed at the opening position.

6. The hydraulic damper device according to claim 1, wherein said cylinder unit further includes a second plug and a spring, said cylinder body further having an open end, said second plug being mounted to said open end of said cylinder body, said piston rod extending through said second plug into said cylinder body, said first plug being slidably sleeved on said piston rod and cooperating with said inner surface and said second plug to define a gas chamber that is separated from said liquid chamber by said first plug, said spring being disposed in said gas chamber between said first and second plugs and urging against said first and second plugs, said first plug being moved toward said second plug to compress said spring when said piston is moved axially away from said first plug, and being moved away from said second plug by urging action of said spring when said piston is moved axially toward said first plug.

* * * * *